(12) United States Patent
Chen et al.

(10) Patent No.: US 11,285,651 B2
(45) Date of Patent: Mar. 29, 2022

(54) VERY THIN TUBE MADE FROM TPU AND ITS PRODUCTION PROCESS

(71) Applicant: BASF SE, Ludwigshafen (DE)

(72) Inventors: Bin-Erik Chen, Shanghai (CN); Akira Nomura, Singapore (SG)

(73) Assignee: BASF SE, Ludwigshafen (DE)

( * ) Notice: Subject to any disclaimer, the term of this patent is extended or adjusted under 35 U.S.C. 154(b) by 823 days.

(21) Appl. No.: 15/574,501

(22) PCT Filed: May 12, 2016

(86) PCT No.: PCT/EP2016/060644
§ 371 (c)(1),
(2) Date: Nov. 16, 2017

(87) PCT Pub. No.: WO2016/184771
PCT Pub. Date: Nov. 24, 2016

(65) Prior Publication Data
US 2018/0141254 A1 May 24, 2018

(30) Foreign Application Priority Data

May 20, 2015 (WO) ................ PCT/CN2015/079378

(51) Int. Cl.
*B29C 48/09* (2019.01)
*D01D 5/24* (2006.01)
(Continued)

(52) U.S. Cl.
CPC ............ *B29C 48/09* (2019.02); *B01D 53/228* (2013.01); *B01D 67/002* (2013.01);
(Continued)

(58) Field of Classification Search
CPC .......... D01D 1/04; D01D 1/065; D01D 5/092; D01D 5/24; D01D 5/38; D01D 5/088;
(Continued)

(56) References Cited

U.S. PATENT DOCUMENTS 2,918,347 A * 12/1959 Notarbartolo ............ D01D 5/08
264/211.17
3,095,258 A * 6/1963 Scott ........................ D01D 5/24
264/177.14
(Continued)

FOREIGN PATENT DOCUMENTS

CN 102446863 A 5/2012
CN 104593883 A 5/2015
(Continued)

OTHER PUBLICATIONS

International Preliminary Report on Patentability and Written Opinion dated Nov. 30, 2017 in PCT/EP2016/060644, 6 pages.
(Continued)

*Primary Examiner* — Xiao S Zhao
*Assistant Examiner* — Joseph S Leyson
(74) *Attorney, Agent, or Firm* — Grüneberg and Myers PLLC

(57) ABSTRACT

The present invention is directed to a process for the preparation of a tube with an outer diameter in the range of from 10 μm to 250 μm consisting of a composition comprising a thermoplastic polyurethane as well as to a tube with an outer diameter in the range of from 10 μm to 250 μm consisting of a composition comprising a thermoplastic polyurethane obtained or obtainable by the process according to the invention. The invention is further directed to the use of a tube according to the invention as a tube for the transportation of a fluid or as gas membrane tube or as an elastic fiber.

13 Claims, 1 Drawing Sheet

(51) Int. Cl.
| | |
|---|---|
| *D01F 6/70* | (2006.01) |
| *D01D 5/088* | (2006.01) |
| *B29C 48/32* | (2019.01) |
| *B29C 48/88* | (2019.01) |
| *B29C 48/00* | (2019.01) |
| *B29C 48/92* | (2019.01) |
| *B01D 69/04* | (2006.01) |
| *B01D 69/08* | (2006.01) |
| *B01D 71/54* | (2006.01) |
| *B01D 67/00* | (2006.01) |
| *D01F 1/10* | (2006.01) |
| *B01D 53/22* | (2006.01) |
| *B29K 75/00* | (2006.01) |
| *B29C 67/24* | (2006.01) |

(52) U.S. Cl.
CPC ....... *B01D 67/0006* (2013.01); *B01D 69/043* (2013.01); *B01D 69/081* (2013.01); *B01D 69/085* (2013.01); *B01D 71/54* (2013.01); *B29C 48/0018* (2019.02); *B29C 48/32* (2019.02); *B29C 48/912* (2019.02); *B29C 48/92* (2019.02); *D01D 5/088* (2013.01); *D01D 5/24* (2013.01); *D01F 1/10* (2013.01); *D01F 6/70* (2013.01); *B01D 2323/30* (2013.01); *B01D 2323/42* (2013.01); *B01D 2325/24* (2013.01); *B29C 67/246* (2013.01); *B29C 2948/92704* (2019.02); *B29K 2075/00* (2013.01)

(58) Field of Classification Search
CPC ..... D01F 1/08; D01F 1/10; D01F 6/70; B29C 48/09; B29C 48/10; B29C 48/32; B29C 48/345; B29C 48/912; B29C 48/913; B29C 48/92; B29C 2948/92704; B29C 67/246; B29K 2075/00; B01D 67/0006; B01D 67/002; B01D 69/04; B01D 69/043; B01D 69/08; B01D 69/081; B01D 69/085; B01D 71/54; B01D 2323/30; B01D 2323/42; B01D 2325/24
See application file for complete search history.

(56) References Cited

U.S. PATENT DOCUMENTS

| | | | | |
|---|---|---|---|---|
| 4,003,974 | A * | 1/1977 | Chantry | D01D 5/16 264/210.8 |
| 4,246,219 | A * | 1/1981 | Yu | D01D 5/24 264/172.17 |
| 5,156,740 | A | 10/1992 | Brüschke | |
| 5,290,271 | A * | 3/1994 | Jernberg | A61F 2/06 424/473 |
| 2004/0251567 | A1* | 12/2004 | Cappellini | B29C 48/911 264/1.29 |
| 2004/0262806 | A1* | 12/2004 | Jen | D01D 5/24 264/211.22 |
| 2010/0105842 | A1 | 4/2010 | Hilmer | |
| 2011/0136402 | A1* | 6/2011 | Matsubara | D01D 5/24 442/338 |
| 2014/0005348 | A1* | 1/2014 | Adachi | D01D 5/04 528/68 |

FOREIGN PATENT DOCUMENTS

| | | |
|---|---|---|
| EP | 0 286 091 B1 | 12/1994 |
| EP | 0 359 834 B1 | 9/1995 |
| WO | WO 00/78437 A1 | 12/2000 |
| WO | WO 2010/125009 A1 | 11/2010 |

OTHER PUBLICATIONS

Marcel Mulder, "Basic Principles of Membrane Technology", Kluwer Academic Publishers, 1996, pp. 71-156 with cover page.

Ji Hua Hao, et al., "Spinning of Cellulose Acetate Hollow Fiber by Dry-Wet Technique of 3C-Shaped Spinneret", Journal of Applied Polymer Science, vol. 62, 1996, pp. 129-133.

Xiaoyu Hu, et al., "Effects of Coagulation Bath Temperature on Polyurethane-Based Hollow Fiber Membrane Morphology", Fibers and Polymers, vol. 15 No. 7, XP002758694, Jul. 1, 2014, pp. 1429-1435.

* cited by examiner

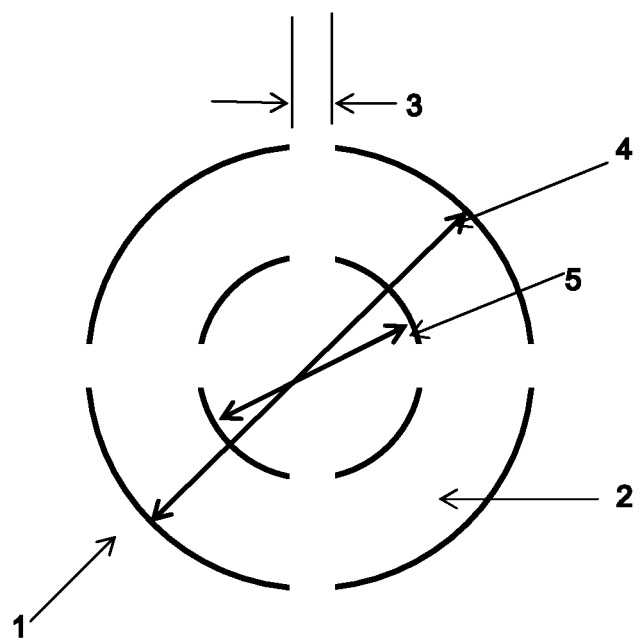

VERY THIN TUBE MADE FROM TPU AND ITS PRODUCTION PROCESS

The present invention is directed to a process for the preparation of a tube with an outer diameter in the range of from 10 µm to 250 µm consisting of a composition comprising a thermoplastic polyurethane as well as to a tube with an outer diameter in the range of from 10 µm to 250 µm consisting of a composition comprising a thermoplastic polyurethane obtained or obtainable by the process according to the invention. The invention is further directed to the use of a tube according to the invention as a tube for the transportation of a fluid or as gas membrane tube or as an elastic fiber.

Very thin hollow structures prepared from crystalline thermoplastics are known from the state of the art. For example CN 102443863 B discloses a process for preparing hollow fibers from polyethylene terephthalate.

Techniques for producing hollow fiber membranes are disclosed for example in M. Mulder, Basic Principles of Membrane Technology, second ed., Kluwer 1996, pp. 71-91. Typical methods include the so-called phase inversion process, melt spinning method or the "dry-wet spinning method" (see e.g. Hao et al. J. Appl. Polym. Science 62, 129-133 (1996)).

So-called hollow fiber spinnerets are often used for producing capillary membranes, in particular by means of the phase inversion process. When producing a hollow fiber membrane by means of a hollow fiber spinneret, the hollow fiber membrane is produced in a so-called precipitation spinning process, wherein the polymers to be precipitated emerge from an annular slit of a spinneret arrangement, while the corresponding precipitant flows out of a central precipitant bore.

Composite hollow fiber membranes built up from several layers of different functions are also known from the state of the art. For example WO 00/78437 discloses a supported hollow fiber membrane in which the support layer consists of braided polymer fibers which give the whole fiber an increased life and resistance to friction and tension while being used in microfiltration or ultrafiltration. A polymer film in which particles of calcined alpha aluminum oxide are dispersed is applied to this support structure.

EP 286 091 B1 discloses a polysulfone hollow fiber membrane which is coated with a solution of ethyl cellulose for use in fluid separation in industrial processes.

EP 359 834 B1 likewise describes multi-layered hollow fiber membranes of polysulfone and cellulose acetate layers, wherein cellulose acetate is applied by precipitation from solution onto the ready-prepared (preformed) polysulfone hollow fibers for use in industrial processes.

U.S. Pat. No. 5,156,740 further discloses a composite membrane consisting of a non-porous separation layer of crosslinked polyvinyl alcohol as well as of a support layer of polysulfone for use in pervaporation processes.

The processes known from the state of the art for preparing tubes on the basis of thermoplastic polyurethanes generally result in tubes with an outer diameter of more than round 500 micron. Very thin tubes can only be prepared on lab scale. Furthermore, the known processes need high attention in order to produce tubes with high accuracy of roundness.

It was therefore an object of the present invention to provide a process which can be used on industrial scale for preparing hollow tubes from thermoplastic polyurethanes, in particular for preparing hollow tubes from thermoplastic polyurethanes which have a low outer diameter. Furthermore, it was an object of the present invention to provide a process for preparing hollow tubes from thermoplastic polyurethanes with high accuracy of roundness.

These objects of the invention are achieved by a process for the preparation of a tube with an outer diameter in the range of from 10 µm to 250 µm consisting of a composition comprising a thermoplastic polyurethane, the process comprising the steps (i) melting a thermoplastic polyurethane in an extruder at a temperature of 160° C. to 230° C.;
(ii) to the molten thermoplastic polyurethane, adding a composition comprising a cross linker comprising isocyanate groups and mixing the resulting mixture to form a melt; (iii) extruding the melt through a spinneret heated at 180° C. to 230° C. to obtain a melt-spun elastic tube;
(iv) cooling the melt spun elastic tube in a cooling section;
(v) bringing the cooled melt spun elastic tube in contact with finish oil in a finishing section, the finish oil being selected from the group consisting of mineral oil and silicone oil;

wherein the extruder, the cooling section and the finishing section are arranged in a vertical setting.

According to the present invention, preferably a TPU melt spinning process with a multi-arc shaped nozzle is used in a spinneret to produce the tube according to the present invention. A vertical setting is used in the melt spinning process, preferably using one or more heated static mixers.

It has been surprisingly found that with the process according to the present invention it is possible to obtain hollow tubes which are round with a level of roundness of accuracy in 1 micron.

According to a further embodiment, the present invention therefore is also directed to the process as disclosed above, wherein the tube is round.

Furthermore, the melt spun thermoplastic polyurethane results in fibers which have soft stretch properties. Therefore, according to a further embodiment, the present invention therefore is also directed to the process as disclosed above, wherein the tube has soft stretch properties.

In the context of the present invention, soft stretch properties are understood to combine sufficient elasticity and retention to fit a given object tightly without putting pressure on the surface of the object.

It has been found that using a vertical arrangement of the apparatuses used according to the present invention, in particular a vertical setting of the extruder, the cooling section and the finishing section allows to produce hollow tubes with a small outer diameter with high accuracy and a high production speed. Compared to the known horizontal setting, the production speed can be improved and the process can be easily applied on industrial scale.

The process according to the present invention comprises the steps (i) to (v). According to step (i) a thermoplastic polyurethane is melted in an extruder at a temperature of 160° C. to 230° C. Subsequently, according to step (ii) a composition comprising a cross linker comprising isocyanate groups is added to the molten thermoplastic polyurethane, and the resulting mixture is mixed to form a melt. The melt obtained in step (ii) is extruded through a spinneret heated at 180° C. to 230° C. to obtain a melt-spun elastic tube according to step (iii). The melt spun elastic tube is cooled in a cooling section (step (iv)), and the cooled melt spun elastic tube is brought in contact with finish oil in a finishing section according to step (v). According to the present invention, the extruder, the cooling section and the finishing section are arranged in a vertical setting.

In principle, any known extruder can be used according to the present invention as long as it is suitable to melt the thermoplastic polyurethane at a temperature in the range of from 160° C. to 230° C. and to mix the components. Suitable extruders are known to the person skilled in the art.

According to the present invention, a spinneret is used for extruding the melt. The spinneret preferably is especially adapted to the process and preferably has more than one opening to produce the hollow tubes. According to a further embodiment, the present invention therefore is also directed to the process as disclosed above, wherein the spinneret has more than one opening.

It is particularly advantageous for the process according to the present invention to use a spinneret with openings in the form of slots such as arc like slots. Suitably, the spinneret has 2 to 5 arc like slots, preferably 3 or 4 arc like slots. More preferably, the openings of the spinneret, in particular the arc like slots are arranged concentric.

According to a further embodiment, the present invention therefore is also directed to the process as disclosed above, wherein the openings are arc-like slots.

Preferably, the spinneret is heated in order to obtain very fine tubes and a high accuracy of roundness. According to a further embodiment, the present invention therefore is also directed to the process as disclosed above, wherein the spinneret is heated to a temperature in the range of from 180° C. to 230° C.

Using the vertical set-up according to the invention, it is possible to produce very fine hollow tubes at industrial scale. It is possible to produce the melt-spun elastic tubes with a production line speed of greater than 500 m/min. Therefore, according to a further embodiment, the present invention therefore is also directed to the process as disclosed above, wherein the production line speed is greater than 500 m/min, preferably in the range of from 500 m/min to 1000 m/min.

Furthermore, it is possible to prepare several tubes in parallel, for example 3 or more tubes in parallel. According to the present invention, it is also possible to produce 5, 6, 7, or 8 tubes in parallel. However, the present invention is not limited to these examples. It is also possible to multiply the number of tubes produced in parallel.

According to a further embodiment, the present invention therefore is also directed to the process as disclosed above, wherein in the process 3 or more tubes are produced in parallel.

Processes for the preparation of melt-spun elastic fibers, in particular melt-spun fibers based on thermoplastic polyurethanes are generally known from the state of the art.

Melt-spun elastic fibers based on thermoplastic polyurethanes, in particular thermoplastic polyurethane and a cross linker comprising isocyanate groups, in particular isocyanate prepolymers, are generally known from the state of the art. In the context of the present invention, any suitable melt-spun elastic tube based on thermoplastic polyurethanes and a cross linker comprising isocyanate groups, in particular isocyanate prepolymers, can be used.

Melt-spun elastic tubes based on thermoplastic polyurethanes generally are prepared using a cross linker. Suitable cross linkers are known from the state of the art. Melt-spun elastic tubes based on a thermoplastic polyurethane which are prepared using a cross linker comprising isocyanate groups are particularly suitable in the context of the present invention. Further compounds such as additives and plasticizers can be used to modify the properties of the resulting melt-spun elastic tubes.

The properties of the melt-spun elastic tubes or the thermoplastic polyurethane used for the preparation of the melt-spun elastic tubes can vary in a broad range.

According to step (i), a thermoplastic polyurethane melted in an extruder at a temperature of 180° C. to 230° C. According to the present invention, any extruder can be used. The melting takes place at a temperature of from 180° C. to 230° C., preferably of from 185° C. to 215° C., in particular of from 190° C. to 210° C.

According to step (ii), to the molten thermoplastic polyurethane, the isocyanate prepolymer composition is added and the resulting mixture is mixed to form a melt.

According to step (iii), the melt is extruded with a spinneret heated at 190° C. to 230° C. to obtain a melt-spun elastic tube.

Melt-spun elastic tubes based on a thermoplastic polyurethane and a cross linker comprising isocyanate groups are generally known. Suitable thermoplastic polyurethanes and cross linkers are also known from the state of the art.

In one embodiment, the additives and/or plasticizer is added to the thermoplastic polyurethane, the isocyanate prepolymer and/or a mixture of the isocyanate prepolymer and the thermoplastic polyurethane.

For producing the melt-spun elastic tube based on a thermoplastic polyurethane, the thermoplastic polyurethane is preferably preheated to temperature from 80° C. to 110° C. and kept at this temperature for a period of time, for example 3 hours to dry the thermoplastic polyurethane.

Then the thermoplastic polyurethane is put into an extruder to melt the thermoplastic polyurethane. The temperature is preferably set from 160° C. to 280° C., more preferably from 180° C. to 250° C., and even more preferably from 180° C. to 220°. The isocyanate prepolymers is preferably preheated to temperature from 40° C. to 90° C., more preferred to 50° C. to 80° C., and then is added to the extruder to be mixed with the molten thermoplastic polyurethane. It should be appreciated that the additives and/or plasticizer are introduced in any way described in the above.

It has been found advantageous to use a thermoplastic polyurethane with a shore hardness in the range of from 60 A to 74 D, determined according to DIN 53505. The shore hardness preferably is in the range of from 70 A to 95 A, most prefer from 75 A to 85 A, in each case determined according to DIN 53505.

According to a further embodiment, the present invention therefore is also directed to the process as disclosed above, wherein the thermoplastic polyurethane has a shore hardness in the range of from 60 A to 74 D, determined according to DIN 53505.

Melt-spun elastic tubes based on thermoplastic polyurethanes with a shore hardness in the range of from 60 A to 74 D, determined according to DIN 53505, are advantageous since this hardness allows for a good combination of physical properties for processing the resulting melt-spun elastic tubes. The resulting tubes are soft and elastic but not too sticky.

A suitable thermoplastic polyurethane which can be used for the preparation of melt-spun elastic tubes in the context of the present invention may comprise
   (a) one or more organic diisocyanates,
   (b) one or more compounds reactive toward isocyanate,
   (c) one or more chain extenders, preferably having a molecular weight of from 60 g/mol to 499 g/mol, and
   (d) optionally at least one catalyst, and/or
   (e) optionally at least one auxiliary, and/or
   (f) optionally at least one additive.

A suitable thermoplastic polyurethane for example has a number average molecular weight in the range of from $8*10^4$ g/mol to $1.8*10^5$ g/mol, more preferably in the range of from $1.0*10^5$ g/mol to $1.5*10^5$ g/mol.

The components (a), (b), (c) and optional components (d), (e) and (f) are generally known from the state of the art and are described by way of example in the following.

Suitable organic diisocyanates (a) are customary aliphatic, cycloaliphatic, araliphatic and/or aromatic isocyanates. Examples thereof include but are not limited to trimethylene diisocyanate, tetramethylene diisocyanate, pentamethylene diisocyanate, hexamethylene diisocyanate, heptamethylene diisocyanate and/or octamethylene diisocyanate, 2-methylpentamethylene 1,5-diisocyanate, butylenes 1,4-diisocyanate, 2-ethylbutylene 1,4-diisocyanate, pentamethylene 1,5-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate (H12MDI), diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, phenylene diisocyanate, and any combination thereof.

Suitable organic diisocyanates are also 2,4-paraphenylenediisocynate (PPDI) and 2,4-tetramethylenexylenediisocyante (TMXDI).

Diphenylmethane 2,2'-, 2,4'- and/or 4,4'-diisocyanate (MDI), and dicyclohexylmethane 4,4'-, 2,4'- and/or 2,2'-diisocyanate (H12MDI) are preferred. Diphenylmethane 2,2'-, 2,4'- and/or 4,4'-diisocyanate are particularly preferred.

It is also possible that the organic diisocyanate (a) is an isocyanate mixture comprising at least 90% by weight, more preferably at least 95% by weight, further preferably at least 98% by weight 4,4'-diphenylmethane diisocyanates (4,4'-MDI), and the remaining is other diisocyanates.

Generally, the isocyanate is either used as a single isocyanate or a mixture of isocyanates.

Generally, any suitable known component (b) can be used in the context of the present invention. The compounds (b) which are reactive toward isocyanate are preferably polyhydric alcohols, polyesterols (i.e. polyester polyols), polyetherols (i.e. polyether polyols), and/or polycarbonate diols, for which the collective term "polyols" is also usually used. The number average molecular weights (Mn) of these polyols are from 0.5 kg/mol to 8 kg/mol, preferably from 0.6 kg/mol to 5 kg/mol, very preferably from 0.8 kg/mol to 3 kg/mol, in particular 1 kg/mol to 2 kg/mol.

These polyols in addition preferably have only primary hydroxy groups. The polyols are particularly preferably linear hydroxyl-terminated polyols. Owing to the method of production, these polyols often comprise small amounts of nonlinear compounds. They are therefore frequently also referred to as "essentially linear polyols".

The polyol is either used as a single polyol or a mixture of polyols. In another preferred embodiment, the polyol is a mixture of two or more polyols. In one preferred embodiment, it is a mixture of polyester polyols and other polyols such as polyester polyols, polyether polyols and/or polycarbonate diols as compounds (b). Polyester polyols, and a mixture of one or more polyether polyols are particularly preferred.

In case of a mixture of polyols, at least one polyester polyol is used in an amount of more than 40% by weight, preferably more than 60% by weight, more preferably more than 80% by weight, and most preferably more than 90% by weight, based on the total weight of the mixture.

Polyether diols, polyester diols and polycarbonate diols in the invention are those commonly known and frequently used in preparation of thermoplastic polyurethanes.

The polyester diols can be based on dicarboxylic acids having from 2 to 12 carbon atoms, preferably from 4 to 8 carbon atoms, which are generally known for the preparation of polyester diols and polyhydric alcohols.

Examples of polyhydric alcohols are alkanediols having from 2 to 10, preferably from 2 to 6, carbon atoms, e.g. ethanediol, 1,3-propanediol, 1,4-butanediol, 1,5-pentanediol, 1,6-hexanediol, 1,10-decanediol, 2,2-dimethyl-1,3-propanediol, 2-methyl-1,3-propanediol, 1,2-propanediol, 3-methyl-1,5-pentanediol, and dialkylene ether glycols such as diethylene glycol and dipropylene glycol. Another examples of polyhydric alcohols are 2,2-Bis(hydroxymethyl)1,3-propanediol and trimethylolpropane. Depending on the desired properties, the polyhydric alcohols can be used either alone or, if appropriate, in mixtures with one another. To keep the glass transition temperature Tg of the polyol very low, it can be advantageous to use a polyester diol based on branched diols, particularly preferably based on 3-methyl-1,5-pentanediol and 2-methyl-1,3-propandiol. The polyester diol is particularly preferably based on at least two different diols, i.e. polyester diols which are prepared by condensation of dicarboxylic acids with a mixture of at least two different diols. In case of a mixture of diols of which at least one is a branched diol, e.g. 2-methyl-1,3-propane diol, the amount of branched diols is more than 40% by weight, preferably more than 70% by weight, more preferably more than 90% by weight, based on the total weight of the diols mixture.

Preferred dicarboxylic acids are, for example: aliphatic dicarboxylic acids, such as succinic acid, glutaric acid, suberic acid, azelaic acid, sebacic acid and preferably adipic acid and aromatic dicarboxylic acids such as phthalic acid, isophthalic acid and terephthalic acid. The dicarboxylic acids can be used individually or as mixtures, e.g. in the form of a mixture of succinic acid, glutaric acid and adipic acid. Mixtures of aromatic and aliphatic dicarboxylic acids can likewise be used. To prepare the polyesterols, it may be advantageous to use the corresponding dicarboxylic acid derivatives such as dicarboxylic esters having from 1 to 4 carbon atoms in the alcohol radical, dicarboxylic anhydrides or dicarboxylic acid chlorides in place of the dicarboxylic acids. The polyester diol is particularly preferably based on adipic acid. In yet another embodiment Polyester polyols based on ε-caprolactone is preferred.

Suitable polyester polyols, for example, may have a number average molecular weight (Mn) ranging from 0.5 to 3 kg/mol, preferably 0.8 kg/mol to 2.5 kg/mol, more preferably from 1 kg/mol to 2 kg/mol, and in particular 1 kg/mol.

Suitable polyether polyols can be prepared by reacting one or more alkylene oxides having from 2 to 4 carbon atoms in the alkylene radical with a starting material molecule containing two active hydrogen atoms. Typical alkylene oxides are ethylene oxide, 1,2-propylene oxide, epichlorohydrin, and 1,2- and 2,3-butylene oxide. Ethylene oxide and mixtures of 1,2-propylene oxide and ethylene oxide are preferably utilized. The alkylene oxides can be used individually, alternately in succession or as mixtures. The typical starting material molecules are, for example water, amino alcohols such as N-alkyldiethanolamines, and diols, ethyleneglycol, 1,3-propyleneglycol, 1,4-butanediol and 1,6-hexanediol. It is also possible to use mixtures of starting material molecules. Suitable polyether polyols also include hydroxyl group-containing polymerization products of tetrahydrofuran.

Preferably used are hydroxyl group-containing polytetrahydrofuran, and co-polyether polyols of 1,2-propylene oxide and ethylene oxide in which more than 50 percent of the hydroxyl groups are primary hydroxyl groups, preferably from 60 to 80 percent, and in which at least part of the ethylene oxide is a block in terminal position.

Most preferred polyether polyol is hydroxyl group-containing polytetrahydrofuran having a number average molecular weight in the range from 0.6 to 3 kg/mol, preferably from 0.8 to 2.5 kg/mol, more preferably from 1 kg/mol to 2 kg/mol.

A preferred polyol is a mixture of at least one polyester polyol and at least one polyether polyol. Examples of polyether polyols include but are not limited to those based on generally known starting materials and customary alkylene oxides.

The polyols which can be used in the context of the present invention can either react with isocyanates to produce isocyanate prepolymer or react with isocyanate prepolymers to produce thermoplastic polyurethanes.

Suitable polyols used for reacting with isocyanates to produce an isocyanate prepolymer may have an average functionality >2, preferably between 2.1 and 3, more preferably between 2.1 and 2.7, and most preferably between 2.2 and 2.5. Furthermore, suitable polyols used for reacting with isocyanate prepolymers to produce TPU preferably have an average functionality of from 1.8 to 2.3, preferably from 1.9 to 2.2, in particular 2. The term "functionality" means the number of groups which react with isocyanate under condition of polymerization.

As chain extenders (c), generally known aliphatic, araliphatic, aromatic and/or cycloaliphatic compounds having a molecular weight of from 60 g/mol to 499 g/mol, preferably from 60 g/mol to 400 g/mol can be used, more preferably bifunctional compounds, for example diamines and/or alkane diols having from 2 to 10 carbon atoms in the alkylene radical, in particular 1,2-ethylene diol, 1,4-butanediol, 1,6-hexanediol, 1,3-propanediol, and/or dialkylene-, trialkylene-, tetraalkylene-, pentaalkylene-, hexaalkylene-, heptaalkylene-, octaalkylene-, nonaalkylene and/or decaalkylene-glycols having from 2 to 8 carbon atoms in alkylene moiety, preferably corresponding oliogopropyleneglycols and/or polypropyleneglycols. It is also possible to use mixtures of the chain extenders. Preference is given to 1,4-butanediol, 1,2-ethylenediol, 1,6-hexanediol or combination thereof as chain extender.

In a preferred embodiment, chain extender (c) is used in an amount of from 2% to 20% by weight, preferably from 5% to 15% by weight, based on the total weight of components (a), (b) and (c).

As chain extender either a single chain extender or a mixture of chain extenders is used.

Suitable catalysts (d), which, in particular, accelerate the reaction between NCO groups of the organic diisocyanates (a) and the polyols (b) and component (c) are tertiary amines which are known and customary in the prior art, for example, triethylamine, dimethylcyclohexylamine, N-methylmorpholine, 2-(dimethylaminoethoxy)ethanol, N,N'-dimethylpiperazine, diazabicyclo[2.2.2]octane and the like, and also, in particular, organic metal compounds such as titanic esters, bismuth carboxylic esters, zinc esters, iron compounds such as iron (III) acetylacetonate, tin compounds, e.g. tin diacetate, tin dioctoate, tin dilaurate or dialkyl tin salts of aliphatic carboxylic acids, e.g. dibutyltin diacetate, dibutyltin dilaurate or the like. In bismuth salts oxidation state of the bismuth is preferably 2 or 3, more preferably 3.

Preferred carboxylic acids of bismuth carboxylic esters have 6 to 14 carbon atoms, more preferred 8 to 12 carbon atoms. Preferred examples of bismuth salts are bismut(III)-neodecanoat, bismut-2-etyhlhexanoat and bismut-octanoat.

The catalysts, if used, are usually used in amounts of from 0.0001 to 0.1 parts by weight per 100 parts by weight of polyols (b). Preference is given to tin catalysts, in particular tin dioctoate.

Apart from catalysts (d), customary auxiliaries (e) and/or additives (f) can be added, if desired, in addition to components (a) to (c).

As auxiliaries (e), for example surface-active substances, flame retardants, nucleating agents, lubricant wax, dyes, pigments, and stabilizers, e.g. against oxidation, hydrolysis, light, heat or discoloration may be used, and as additives (f), for example inorganic and/or organic fillers and reinforcing materials. As hydrolysis inhibitors, preference is given to oligomeric and/or polymeric aliphatic or aromatic carbodiimides. To stabilize thermoplastic polyurethanes against aging, stabilizers can also be added.

Further details regarding optional auxiliaries and additives may be found in the specialist literature, e.g. in Plastics Additive Handbook, 5th edition, H. Zweifel, ed, Hanser Publishers, Munich, 2001.

Besides the stated components a), b), and c) and, if appropriate, d) and e) it is also possible to use chain regulators, usually having a number average molecular weight of 31 g/mol to 3 kg/mol. These chain regulators are compounds which have only one isocyanate-reactive functional group, such as monofunctional alcohols, monofunctional amines and/or monofunctional polyols, for example. Chain regulators of this kind allow a precise rheology to be set, particularly in the case of TPUs. Chain regulators can be used generally in an amount of 0 to 5, preferably 0.1 to 1, part(s) by weight, based on 100 parts by weight of component b), and in terms of definition are included in component (c).

To adjust the hardness of the thermoplastic polyurethane, component (b) which is reactive toward isocyanates and chain extenders (c) can be varied within a relatively wide range of molar ratios. Molar ratios of component (b) to the total of chain extenders (c) to be used from 10:1 to 1:10, in particular from 1:1 to 1:4, have been found to be useful, with hardness of the thermoplastic polyurethane increasing with increasing content of (c).

Suitable thermoplastic polyurethanes preferably have a Shore A hardness of generally less than Shore A 98 in accordance with DIN 53505, more preferred from 60 Shore A to 98 Shore A, even more preferred from 70 Shore A to 95 Shore A, and most preferred from 75 Shore A to 90 Shore A.

Preferably, a thermoplastic polyurethane suitable in the context of the present invention has a density in a range from 1.0 g/cm$^3$ to 1.3 g/cm$^3$. The tensile strength of the thermoplastic polyurethane in accordance with DIN 53504 is more than 10 MPa, preferably more than 15 MPa, particularly preferably more than 20 MPa. The thermoplastic polyurethane suitable in the context of the present invention has an abrasion loss in accordance with DIN 53516 of generally less than 150 mm$^3$, preferably less than 100 mm$^3$.

In general, thermoplastic polyurethanes are prepared by reacting (a) isocyanates with (b) compounds reactive toward isocyanates, usually having a number average molecular weight (Mn) of from 0.5 kg/mol to 10 kg/mol, preferably from 0.5 kg/mol to 5 kg/mol, particularly preferably from 0.8 kg/mol to 3 kg/mol, and (c) chain extenders having a number average molecular weight (Mn) of from 0.05 kg/mol to 0.499 kg/mol, if appropriate in the presence of (d) catalysts and/or (e) conventional additives.

The thermoplastic polyurethane may be produced by two different kinds of processes, namely "one-step" processes and "two-step" process which are known from the state of the art.

According to step (ii), to the molten thermoplastic polyurethane, the isocyanate prepolymer composition is added and the resulting mixture is mixed to form a melt. Suitable isocyanate prepolymers are described in the following by way of example.

In such a process, the isocyanate prepolymer composition preferably is heated and used at temperature above 20° C. to have better flowability, the temperature of the isocyanate prepolymer composition preferably is lower than 80° C. to avoid undesired reactions, e.g. allophante cross linking.

For the purpose of the present invention, the term "isocyanate prepolymer" refers to the reaction product of isocyanates with compounds which are reactive toward isocyanates and have a number average molecular weight in the range from 0.5 kg/mol to 10 kg/mol, preferably from 1 kg/mol to 5 kg/mol. Isocyanate prepolymers are intermediates of the isocyanate polyaddition reaction. In a preferred embodiment the prepolymer has a glass transition temperature Tg below −15° C. and a melting temperature below 70° C. measured by means of DSC in accordance with DIN EN ISO 11357-1.

Suitable isocyanate prepolymers may have preferably a NCO content of from 4 to 27 parts by weight based on the weight of the isocyanate prepolymer. Suitable isocyanate prepolymer according to the invention may be used in the form of a single isocyanate prepolymer or a mixture of isocyanate prepolymers.

Most preferred, the isocyanate prepolymer is the reaction product between diphenylmethane 4,4'-diisocyanate, and/or diphenylmethane 2,2'-diisocyanate, and/or diphenylmethane 2,4'-diisocyanate (MDI) and a polyester polyol based on adipic acid, 2-methyl-1,3-propanediol and 1,4-butanediol, wherein the mole ratio of said polyester polyols to said diisocyanates is 1:1 to 1:5, preferably 1:1.2 to 1:3, more preferably 1:1.5 to 1:2.5, such as 1:2.

In the context of the present invention, the isocyanate prepolymer has an average isocyanate functionality (Fn) of 2 or more than 2, preferably between 2 and 3, more preferably between 2 and 2.7, most preferably between 2 and 2.5.

Additionally, plasticizers can be used in the process for preparing the melt-spun elastic tubes. Suitable plasticizers are generally known from the state of the art, for example from David F. Cadogan and Christopher J. Howick "Plasticizers" in Ullmann's Encyclopedia of Industrial Chemistry 2000, Wiley-VCH, Weinheim.

Suitable plasticizers are $C_{3-15}$, preferably $C_{3-10}$, polycarboxylic acids and their esters with linear or branched $C_{2-30}$, aliphatic alcohols, benzoates, epoxidized vegetable oils, sulfonamides, organophosphates, glycols and its derivatives, and polyethers. Preferred plasticizers are sebacic acid, sebacates, adipic acid, adipates, glutaric acid, glutarates, phthalic acid, phthalates (for example with C8 alcohols), azelaic acid, azelates, maleic acid, maleate, citric acid and its derivatives, see for example WO 2010/125009, incorporated herein by reference. The plasticizers may be used in combination or individually.

Further additives such as for example a polymethylene polyphenyl polyisocyanate may be added in the process for preparing the melt-spun elastic fibers.

For the purpose of the present invention, the term further additives refers to any substance that will be added to the reaction system of said thermoplastic polyurethane, said isocyanate prepolymer and said plasticizer, but not include the said thermoplastic polyurethane, said isocyanate prepolymer and said plasticizer. Usually such substances include the auxiliaries and additives commonly used in this art, as shown in the above under the subtitle "thermoplastic polyurethane".

The melt-spun elastic fiber based on a thermoplastic polyurethane is generally prepared by reacting the following components:
(1) a thermoplastic polyurethane; and
(2) the isocyanate prepolymer composition.

In a specific embodiment, the process for preparing a melt-spun elastic fiber comprises reacting the following components:
(1) a thermoplastic polyurethane;
(2) the isocyanate prepolymer composition; and
(3) further additives.

According to the present invention, the thermoplastic polyurethane, the isocyanate prepolymer composition and optionally further additives are mixed and the resulting mixture is further treated.

The resulting mixture is extrudes through a spinneret according to step (iii) of the process according to the invention. The spinneret is heated at a temperature in the range of from 180° C. to 230° C. According to the present invention, the spinneret is suitable to produce a hollow tube. In particular, the spinneret comprises a defined nozzle. A suitable nozzle is used as disclosed below. A preferred design of a nozzle is described in connection with FIG. 1.

The melt-spun elastic tube obtained is subsequently cooled in a cooling section. The cooling section has to have sufficient dimensions in order to allow cooling of the tube. The tube preferably is cooled with air, preferably with air at room temperature according to the present invention.

After cooling the melt-spun elastic tube to a suitable temperature, the tube is transferred into a finishing section. In the finishing section the cooled melt spun elastic tube is brought in contact with finish oil.

According to the present invention, the finish oil used in step (v) is selected from the group consisting of mineral oil and silicone oil. In principle, any mineral oil or silicon oil can be used. Suitable oils are for example SDX-148 or SDX-109 available from Takemoto Oil & Fat Co., Ltd., or TST-09 available from Matsumoto Yushi-seiyaku Co., Ltd.

Optionally, the process further includes the following subsequent steps:
(vi) winding up the fiber through a roller at a line speed of 100 to 1000 m/min;
(vii) storing the fibers.

The process may comprise further additional steps.

Storing the fibers can be carried out for any suitable length of time under suitable conditions, for example for 15 h at 80° C.

With the process according to the present invention, very fine tubes can be prepared, for example tubes with an outer diameter in the range of from 10 μm to 250 μm. According to a further embodiment, the present invention therefore is also directed to the process as disclosed above, wherein the outer diameter of the tube is in the range of from 15 to 200 μm, preferably in the range of from 20 to 150 μm.

The hollow ratio of the tubes prepared according top the present invention can vary. It is for example possible to obtain tubes with a hollow ratio in the range of from 5 to 50%. According to a further embodiment, the present invention therefore is also directed to the process as disclosed above, wherein the hollow ratio of the tube is in the range of from 5 to 50%, preferably in the range of from 10 to 40%.

According to the present invention, the hollow ratio is defined using the ratio of inner diameter ($d_{inner}$) to outer diameter ($d_{outer}$). In the context of the present invention, the hollow ratio is defined according to the following formula (I):

$$\text{Hollow ratio} = (d_{inner}/d_{outer})^2 * 100\% \quad (I)$$

According to a further aspect, the present invention is also directed to a tube with an outer diameter in the range of from 10 μm to 250 μm consisting of a composition comprising a thermoplastic polyurethane obtained or obtainable by a process as disclosed above. According to a preferred embodiment, the tube is round.

The tubes, in particular the round tubes according to the present invention are suitable for the transportation of fluids or gases, in particular in medical applications. Furthermore, the tubes can be used as elastic fibers. The tubes have soft stretch properties as set out above which makes them suitable for the use as elastic fibers for various applications.

According to a further aspect, the present invention is also directed to the use of a tube obtained or obtainable by a process as described above or a tube according to the invention as a tube for the transportation of a fluid or as gas membrane tube or as an elastic fiber.

According to a further embodiment, the present invention therefore is also directed to the use of a tube as disclosed above, wherein the tube has soft stretch properties.

The present invention includes the following embodiments, wherein these include the specific combinations of embodiments as indicated by the respective interdependencies defined therein.

1. Process for the preparation of a tube with an outer diameter in the range of from 10 μm to 250 μm consisting of a composition comprising a thermoplastic polyurethane, the process comprising the steps
   (i) melting a thermoplastic polyurethane in an extruder at a temperature of 160° C. to 230° C.;
   (ii) to the molten thermoplastic polyurethane, adding a composition comprising a cross linker comprising isocyanate groups and mixing the resulting mixture to form a melt; (iii) extruding the melt through a spinneret heated at 180° C. to 230° C. to obtain a melt-spun elastic tube;
   (iv) cooling the melt spun elastic tube in a cooling section;
   (v) bringing the cooled melt spun elastic tube in contact with finish oil in a finishing section, the finish oil being selected from the group consisting of mineral oil and silicone oil;
   wherein the extruder, the cooling section and the finishing section are arranged in a vertical setting.
2. The process according to embodiment 1, wherein the tube is round.
3. The process according to embodiment 1 or 2, wherein the tube has soft stretch properties.
4. The process according to any of embodiments 1 to 3, wherein the spinneret has more than one opening.
5. The process according to any of embodiments 1 to 4, wherein the openings are arc-like slots.
6. The process according to any of embodiments 1 to 5, wherein the spinneret is heated to a temperature in the range of from 180° C. to 230° C.
7. The process according to any of embodiments 1 to 6, wherein the production line speed is greater than 500 m/min.
8. The process according to any of embodiments 1 to 7, wherein in the process 3 or more tubes are produced in parallel.
9. The process according to any of embodiments 1 to 8, wherein the thermoplastic polyurethane has a shore hardness in the range of from 60 A to 74 D, determined according to DIN 53505.
10. The process according to any of embodiments 1 to 9, wherein the outer diameter of the tube is in the range of from 15 to 200 μm, preferably in the range of from 20 to 150 μm.
11. The process according to any of embodiments 1 to 10, wherein the hollow ratio of the tube is in the range of from 5 to 50%, preferably in the range of from 10 to 40%.
12. Tube with an outer diameter in the range of from 10 μm to 250 μm consisting of a composition comprising a thermoplastic polyurethane obtained or obtainable by a process according to any one of embodiments 1 to 11.
13. The tube according to embodiment 12, wherein the tube is round.
14. Use of a tube obtained or obtainable by a process according to any one of embodiments 1 to 11 or a tube according to embodiment 12 or 13 as a tube for the transportation of a fluid or as gas membrane tube or as an elastic fiber.
15. The use according to embodiment 12, wherein the tube has soft stretch properties.

BRIEF DESCRIPTION OF THE FIGURE

FIG. 1: shows a schematic view of a nozzle design which can be used in the process according to the invention. The cut of the nozzle (1) has a ring structure (2) with a defined number of gaps (3). The width of the gaps can vary depending on the nozzle design. The nozzle is further characterized by the outer diameter (4) and the inner diameter (5) of the nozzle.

Examples will be used below to illustrate the invention. The following examples are intended to illustrate the invention without limiting.

EXAMPLES

1. Design of the Nozzles

Three types of nozzles were used, under the name of H-01, H-02, H-03, using the nozzle design as depicted in FIG. 1.

The nozzle designs are summarized in table 1.

TABLE 1 characteristic features of nozzles H-01, H-02 and H-03

|  | H01 | H02 | H03 |
|---|---|---|---|
| Outer diameter of nozzle (mm) | 1.5 | 1.5 | 1.8 |
| Inner diameter of nozzle (mm) | 1.4 | 1.4 | 1.7 |
| No. of gaps | 4 | 3 | 4 |
| Width of gap (mm) | 0.1 | 0.1 | 0.1 |

2. Melt Spinning with Hollow Nozzles

Melt spinning test was carried out with three types of nozzles shown above.

TPU is based on 1,6-hexanediol, 4,4'-MDI and polyester diol and has shore hardness 85 A. The polyester diol is made from adipic acid and 1,4-butanediol.

The process comprises the following steps:
(1) melting a thermoplastic polyurethane through a single screw extruder;
(2) adding a cross-linking agent to the melted TPU polymer;
(3) mixing the cross-linking agent and TPU melt by going through a dynamic mixer;
(4) extruding the melt by gear pumps through a spinneret which is heated, in each spinneret has an nozzle to make the melt form a desired shape of the fiber;
(5) the melt is cooled by passing through room temperature air in a horizontal area;
(6) spraying finish oil on the fiber, and the finish oils was silicone oil;
(7) winding up the fiber through a roller;
(8) storing the fibers.

TABLE 2

Processing parameters.

| | |
|---|---|
| Extrusion Temperature (° C.) | 180, 200, 200 |
| Spinneret temperature (° C.) | 221 |
| Winding speed (m/min) | 692 |
| Throughput per nozzle (cc/min) | 1.72 |

3. Results of Melt Spinning

Hollow TPU fibers were obtained by above test, all three nozzles can be used to produce hollow TPU fiber. The cross section of the hollow fiber were measured under microscope and the results are summarized in table 3a and 3b.

TABLE 3a

| | Results | | |
|---|---|---|---|
| spinneret | outer diameter 1 micron | outer diameter 2 micron | avrage out dia micron |
| H-01 | 70.4 | 66.08 | 68.24 |
| H-01 | 59.65 | 67.16 | 63.405 |
| H-02 | 57.9 | 52.48 | 55.19 |
| H-02 | 60.55 | 61.42 | 60.985 |
| H-02 | 59.64 | 57.66 | 58.65 |
| H-03 | 63.42 | 63.66 | 63.54 |
| H-03 | 63.42 | 63.16 | 63.29 |
| H-03 | 60.83 | 61.47 | 61.15 |

TABLE 3b

| | Results | | | | | |
|---|---|---|---|---|---|---|
| spinneret | inner dia 1 micron | inner dia 2 micron | av. inner dia micron | area hollow ratio % | area hollow ratio in average % | |
| H-01 | 26.78 | 20.62 | 23.7 | 12 | 10 | very round |
| H-01 | 18.15 | | 18.15 | 8 | | very round |
| H-02 | 20.31 | | 20.31 | 14 | 12 | very round |
| H-02 | 20.37 | | 20.37 | 11 | | very round |
| H-02 | 19.04 | | 19.04 | 11 | | very round |

TABLE 3b-continued

| | Results | | | | | |
|---|---|---|---|---|---|---|
| spinneret | inner dia 1 micron | inner dia 2 micron | av. inner dia micron | area hollow ratio % | area hollow ratio in average % | |
| H-03 | 20.21 | | 20.21 | 10 | 9 | very round |
| H-03 | 19.85 | | 19.85 | 10 | | very round |
| H-03 | 16.96 | | 16.96 | 8 | | very round |

The invention claimed is:

1. A process for preparing at least one tube with an outer diameter of from 10 μm to 250 μm comprising a thermoplastic polyurethane, the process comprising
(i) melting a thermoplastic polyurethane in an extruder at a temperature of 160° C. to 230° C. to obtain a molten thermoplastic polyurethane;
(ii) to the molten thermoplastic polyurethane, adding a composition comprising a cross linker comprising isocyanate groups to obtain a mixture and mixing the mixture to form a melt;
(iii) extruding the melt through a spinneret heated at 180° C. to 230° C. to obtain a melt-spun elastic tube;
(iv) cooling the melt spun elastic tube in a cooling section to obtain a cooled melt spun elastic tube; and
(v) contacting the cooled melt spun elastic tube with finish oil in a finishing section, the finish oil being selected from the group consisting of mineral oil and silicone oil;
wherein the extruder, the cooling section, and the finishing section are arranged in a vertical setting;
wherein the tube is round with a level of roundness of accuracy in 1 micron.

2. The process according to claim 1, wherein the tube has soft stretch properties.

3. The process according to claim 1, wherein the spinneret has more than one opening.

4. The process according to claim 3, wherein said more than one opening are arc-like slots.

5. The process according to claim 1, wherein the spinneret is heated to a temperature of from 180° C. to 230° C.

6. The process according to claim 1, which is performed at a production line speed of greater than 500 m/min.

7. The process according to claim 1, wherein 3 or more tubes are produced in parallel.

8. The process according to claim 1, wherein the thermoplastic polyurethane has a shore hardness of from 60 A to 74 D, determined according to DIN 53505.

9. The process according to claim 1, wherein the outer diameter of the tube ranges from 15 to 200 μm.

10. The process according to claim 1, wherein a hollow ratio of the tube ranges from 5 to 50%.

11. The process according to claim 1, wherein the cooled melt spun elastic tube is a single cooled melt spun elastic tube, and further comprising:
winding the single cooled melt spun elastic tube after the contacting onto a roll.

12. The process according to claim 1, wherein the melt consists of the molten thermoplastic polyurethane and the crosslinker.

13. The process according to claim 1, wherein the spinneret has a ring structure nozzle with concentrically positioned arc like slots.

* * * * *